US012741613B2

(12) United States Patent
Schroeter et al.

(10) Patent No.: US 12,741,613 B2
(45) Date of Patent: Sep. 22, 2026

(54) SYSTEMS AND METHODS FOR WIPER CONTROL BASED ON DRIVER GAZE DETECTION

(71) Applicant: Ford Global Technologies, LLC, Dearborn, MI (US)

(72) Inventors: Robert Schroeter, Livonia, MI (US); Mahmoud Yousef Ghannam, Canton, MI (US); John Robert Van Wiemeersch, Novi, MI (US); Aaron L. Mills, Ann Arbor, MI (US)

( * ) Notice: Subject to any disclaimer, the term of this patent is extended or adjusted under 35 U.S.C. 154(b) by 160 days.

(21) Appl. No.: 18/586,754

(22) Filed: Feb. 26, 2024

(65) Prior Publication Data

US 2025/0269821 A1 Aug. 28, 2025

(51) Int. Cl.
*B60S 1/08* (2006.01)

(52) U.S. Cl.
CPC ........... *B60S 1/0844* (2013.01); *B60S 1/0825* (2013.01); *B60S 1/0896* (2013.01)

(58) Field of Classification Search
CPC ..... B60S 1/0844; B60S 1/0825; B60S 1/0896
See application file for complete search history.

(56) References Cited

U.S. PATENT DOCUMENTS

2006/0006826 A1* 1/2006 Morishita ............ B60S 1/0896 318/443
2015/0310313 A1* 10/2015 Murayama ............ B60K 35/22 382/104
2015/0332099 A1* 11/2015 Kosubek ............... B60S 1/0844 348/148
2017/0305349 A1* 10/2017 Naboulsi ................. B60R 1/025
2018/0093631 A1* 4/2018 Lee ....................... B60W 40/08
2018/0099645 A1* 4/2018 Oikawa ................. B60S 1/0818
2019/0047522 A1 2/2019 Giraud et al.
(Continued)

FOREIGN PATENT DOCUMENTS

CN 112837258 A * 5/2021 ............. G06V 20/56
DE 102023000164 A1 * 9/2023 ............ B60S 1/0818
(Continued)

OTHER PUBLICATIONS

Staib et al., DE102023000164A1_Machine Translation (Year: 2023).*
(Continued)

*Primary Examiner* — Jelani A Smith
*Assistant Examiner* — Alyssa Rorie
(74) *Attorney, Agent, or Firm* — Frank Lollo; Eversheds Sutherland (US) LLP

(57) ABSTRACT

A vehicle including a glazing, a wiper, a detection unit and a processor is disclosed. The detection unit may be configured to capture images of a vehicle interior portion and a vehicle surrounding. The processor may be configured to determine a precipitation intensity and that the vehicle may be in a stationary state. The processor may further determine that a user located in the vehicle interior portion may be looking out of the vehicle through the glazing based on inputs obtained from the detection unit, responsive to determining that the vehicle may be in the stationary state. The processor may further cause a wiper movement at a speed associated with the precipitation intensity, when the user may be looking out of the vehicle through the glazing.

20 Claims, 5 Drawing Sheets

(56) References Cited

U.S. PATENT DOCUMENTS

| | | | | |
|---|---|---|---|---|
| 2022/0139192 | A1* | 5/2022 | Stenneth | G08B 27/006 340/905 |
| 2022/0388816 | A1 | 12/2022 | Hofmeister et al. | |
| 2023/0098949 | A1* | 3/2023 | Schuetz | H04N 23/811 348/148 |
| 2023/0242079 | A1* | 8/2023 | Hikida | B60S 1/0844 348/148 |
| 2025/0121799 | A1* | 4/2025 | Shimizu | B60R 21/38 |
| 2025/0206327 | A1* | 6/2025 | Shaik | G06V 10/56 |
| 2025/0236260 | A1* | 7/2025 | Qin | B60S 1/08 |

FOREIGN PATENT DOCUMENTS

| | | | |
|---|---|---|---|
| JP | 2605101 | B2 | 4/1997 |
| JP | 2007307992 | A | 11/2007 |
| JP | 2010064640 | A | 3/2010 |

OTHER PUBLICATIONS

Ying, CN112837258A_Machine Translation (Year: 2021).*

Jacob M. Wetzei, et.al., The University of Michigan Transportation Research Institute, An Examination of Naturalistic Windshield Wiper Usage, Dec. 2004, pp. 1-18.

* cited by examiner

SYSTEMS AND METHODS FOR WIPER CONTROL BASED ON DRIVER GAZE DETECTION

FIELD

The present disclosure relates to systems and methods for controlling wiper movement of a vehicle based on driver gaze detection when the vehicle is stationary.

BACKGROUND

Vehicles typically include windshields through which vehicle drivers or occupants view surrounding areas. For example, a vehicle may include a front windshield through which a vehicle driver may view the road on which the vehicle may be traveling. The vehicle may additionally include wipers that may clean the windshield when rainwater, snow, etc. may be present on the windshield.

The vehicle may additionally include rain sensors or rain sensing modules that detect presence of rainwater on the windshield. The rain sensors typically facilitate the vehicle in automatically activating and controlling wiper speed when the rain sensors detect rainwater on the windshield.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
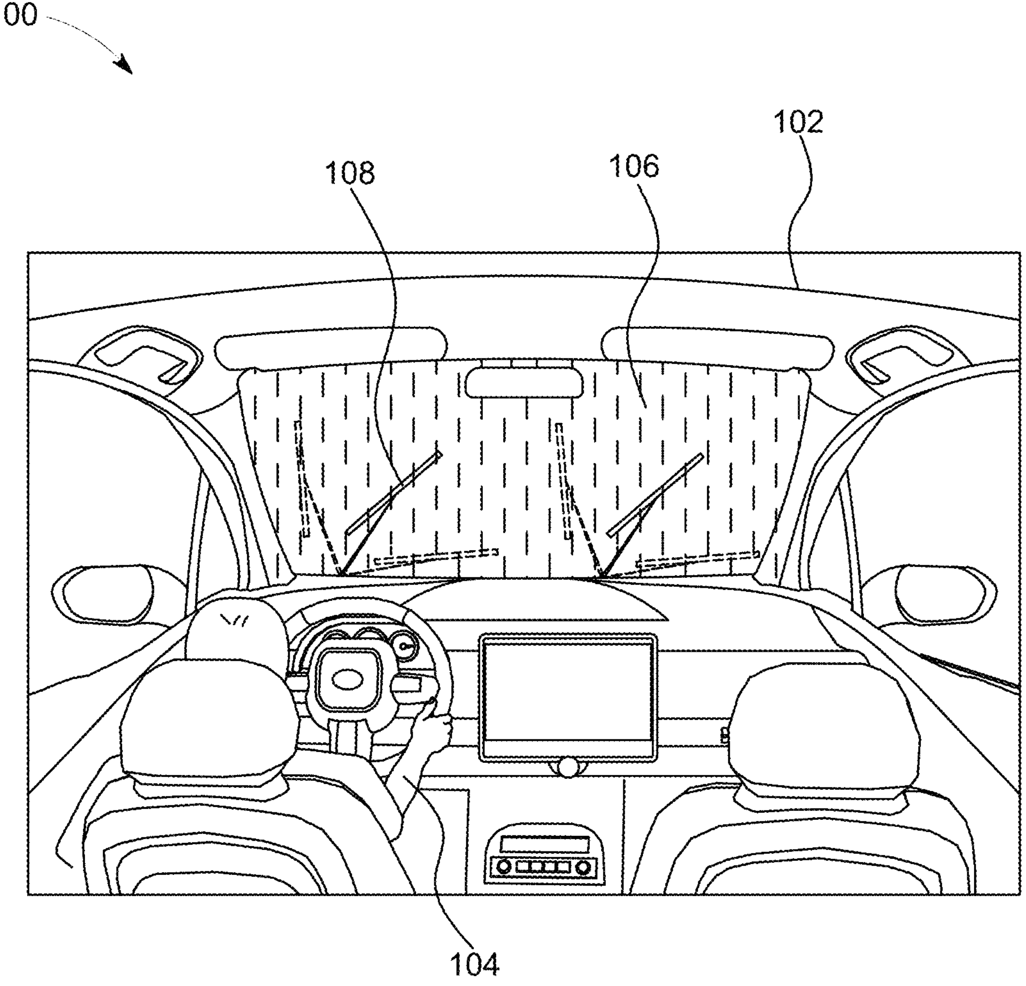
FIG. 1 depicts an environment in which techniques and structures for providing the systems and methods disclosed herein may be implemented.

The present disclosure describes a vehicle that may be configured to operate vehicle wipers in an optimal manner, such that the wipers are activated to clean a vehicle glazing (e.g., windshield, back lite window etc.) only when necessary, and not otherwise, thereby conserving vehicle power/energy. The vehicle may first determine a vehicle speed when it may be raining in a geographical area where the vehicle may be located. The vehicle may further determine a precipitation intensity or a rate at which raindrops (or snow, splash, soot, dirt, ash, etc.) may be falling on the windshield, based on inputs obtained from a vehicle rain sensor. Responsive to determining that the vehicle speed may be greater than a predefined speed threshold, the vehicle may cause the wipers to move at a wiper speed that may be associated with the determined precipitation intensity. As an example, the vehicle may cause the wipers to move at a higher wiper speed when the precipitation intensity may be high and at a lower wiper speed when the precipitation intensity may be low.

On the other hand, responsive to determining that the vehicle speed may be less than the predefined speed threshold, the vehicle may check/determine whether the vehicle may be stationary/parked or moving at a slow speed. In some aspects, the vehicle may determine that the vehicle may be stationary/parked when a vehicle transmission may be in a park state. In other aspects, the vehicle may determine whether the vehicle may be stationary/parked or moving at a slow speed by performing image processing of images captured by vehicle's exterior cameras (e.g., front, side and/or rear cameras). In this case, the vehicle may determine a blur level associated with the captured images based on the image processing and compare the blur level with a predefined blur threshold. In some aspects, the vehicle may determine that the vehicle may be stationary when the blur level may be less than the predefined blur threshold and may determine that the vehicle may be moving slowly when the blur level may be greater than the predefined blur threshold. In further aspects, the vehicle may determine whether the vehicle may be stationary/parked or moving at a slow speed based on inputs obtained from vehicle's wheel sensors.

Responsive to determining that the vehicle may not be stationary (i.e., when the vehicle may be moving slowly), the vehicle may cause the wipers to move at the wiper speed associated with the precipitation intensity. On the other hand, responsive to determining that the vehicle may be stationary, the vehicle may determine whether a user/driver located in a vehicle interior portion may be looking out of the vehicle through the glazing, based on images obtained from vehicle's interior cameras. The vehicle may cause the wipers to move at the wiper speed associated with the precipitation intensity when the user may be looking through the glazing and may not enable (or disable) the wiper movement when the user may be looking away from the glazing (thereby conserving vehicle power/energy).

In some aspects, the vehicle may further determine whether a person or another vehicle may be located in a predefined zone or a "splash zone" in proximity to the vehicle when the vehicle may be stationary and may cause the wiper movement only when no person/vehicle may be located in the predefined zone.

The vehicle may be further configured to cause the wiper movement when a predefined condition/situation in proximity to the vehicle may be detected and when the vehicle may be stationary, irrespective of whether the user may be looking through the glazing or not. Examples of such predefined conditions include, but are not limited to, a road condition of a road on which the vehicle is located being suboptimal, an obstacle presence detection in front of the vehicle, and/or the like.

The present disclosure discloses a vehicle that optimally operates vehicle wipers only when necessary, thereby enhancing user convenience, and conserving vehicle power/energy at the same time. Specifically, the vehicle causes the wiper movement when the user may be looking through the glazing (when the vehicle may be stationary), thereby activating the wipers only when the user may actually need to view through a clear glazing/windshield. The vehicle may further ensure that the wipers are activated only when no one may be located in proximity to a predefined "splash zone" in proximity to the vehicle, thereby ensuring that persons/vehicles in the splash zone do not face any inconvenience.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may take the form of any passenger or commercial vehicle such as a car, a work vehicle, a crossover vehicle, a truck, a van, a minivan, a taxi, a bus, etc. The vehicle 102 may be a manually driven vehicle, may be configured to operate in a partially autonomous mode, and may include any powertrain such as a gasoline engine, one or more electrically-actuated motor(s), a hybrid system, etc. In the exemplary aspect depicted in FIG. 1, the vehicle 102 may be traveling through a geographical area that may have presence of rainfall, snowfall, hailstorm, and/or the like. Further, the vehicle 102 may be driven by a driver/user 104.

The vehicle 102 may include a glazing 106 (e.g., a front windshield) that may be wet due to rain, as shown in FIG. 1. In some aspects, the glazing 106 may be a front windshield, a rear windshield, back lite window, etc. Hereinafter, the glazing 106 is referred to as windshield 106; however, such terminology should not be construed as limiting. A person ordinarily skilled in the art may appreciate that the user's view of the area in front of the vehicle 102 may be obstructed when the user 104 may be viewing outside through the wet windshield 106. The vehicle 102 may further include front wipers 108 (or wipers 108) that may be configured to clean the windshield 106.

The vehicle 102 may be configured to automatically control the wiper operation when rainwater (or snow) may be present on the windshield 106. Specifically, in some aspects, the vehicle 102 may automatically enable/cause the wipers 108 to move and clean the windshield 106 when rainwater (or snow, splash, soot, dirt, ash, etc.) may be present on the windshield 106 and the vehicle 102 may be moving at a speed greater than a predefined speed threshold (which may be, for example, in a range of 4-6 kilometers per hour or 2.5-3.5 miles per hour). In an exemplary aspect, the vehicle 102 may cause the wipers 108 to move at a wiper speed that may be based on or associated with a precipitation intensity. For example, the vehicle 102 may cause the wipers 108 to move at a higher wiper speed when the precipitation intensity may be high, thereby enabling the wipers 108 to efficiently clean the windshield 106 and enhancing user's convenience of driving the vehicle 102. On the other hand, the vehicle 102 may cause the wipers 108 to move at a lower wiper speed (or at a low frequency) when the precipitation intensity may be low, thereby conserving vehicle power/energy and simultaneously enabling the wipers 108 to efficiently clean the windshield 106. In some aspects, the precipitation intensity may be associated with a rate at which raindrops (or snow, splash, soot, dirt, ash, etc.) may be falling on the windshield 106 and may be determined by a vehicle rain sensor (not shown).

The vehicle 102 may be further configured to control the wiper operation when rainwater (or snow) may be present on the windshield 106 and the vehicle 102 may be traveling at a vehicle speed less than the predefined speed threshold or the vehicle 102 may be stationary, such that the wipers 108 operate and clean the windshield 106 only when it may be necessary or desirable to operate the wipers 108 and not otherwise (thereby conserving vehicle power/energy). In this case, the vehicle 102 may first determine whether the vehicle 102 may be stationary (i.e., having zero vehicle speed) or moving slowly (e.g., moving at the vehicle speed less than the predefined speed threshold described above). In some aspects, the vehicle 102 may determine that the vehicle 102 may be stationary when a vehicle transmission mode may be set to a park state/mode. In additional or alternative aspects, the vehicle 102 may determine that the vehicle 102 may be stationary by performing image processing (e.g., by using Artificial Intelligence/Machine Learning (AI/ML) based algorithms) of images captured by a vehicle detection unit (shown as vehicle sensory system 230 in FIG. 2) and determining whether a blur level associated with a vehicle surrounding image (e.g., an image of an area in front of the vehicle 102) is greater than or less than a predefined blur threshold. In some aspects, the vehicle 102 may determine that the vehicle 102 may be moving slowly (and hence not stationary) when the blur level may be greater than the predefined blur threshold and may determine that the vehicle 102 may be stationary when the blur level may be less than the predefined blur threshold. In further aspects, the vehicle may determine whether the vehicle may be stationary/parked or moving at a slow speed based on inputs obtained from vehicle's wheel sensors.

In some aspects, the vehicle detection unit may include one or more of a vehicle interior camera, a vehicle exterior camera (including vehicle front, side and/or rear exterior camera(s)), a radio detection and ranging (radar) sensor, a light detection and ranging (lidar) sensor, and/or the like. A person ordinarily skilled in the art may appreciate that when the vehicle 102 may be moving, the images of the area outside of the vehicle 102 captured by the vehicle detection unit may be blurred (e.g., due to "moving" traffic light colors, surrounding environment, etc.), and the vehicle 102 detects the blur level of the images captured by the vehicle detection unit to determine whether the vehicle 102 may be moving slowly or stationary.

Responsive to determining that the vehicle 102 may be moving slowly (and hence not stationary), the vehicle 102 may cause the wipers 108 to move at the wiper speed that may be associated with the precipitation intensity, as described above. On the other hand, responsive to determining that the vehicle 102 may be stationary, the vehicle 102 may determine a gaze direction of the user 104 based on inputs/images obtained from the vehicle detection unit. Specifically, the vehicle 102 may determine whether the user 104 may be looking out of the vehicle 102 through the windshield 106, or may be looking away from the windshield 106 (e.g., looking towards user's phone, or sideways through vehicle's side windows, etc.) based on the user images obtained from the vehicle detection unit. Responsive to determining that the user 104 may be looking away from the windshield 106, the vehicle 102 may not enable (or disable) the wiper movement, even when rainwater (or snow, splash, soot, dirt, ash, etc.) may be present on the windshield 106. In this manner, the vehicle 102 may conserve vehicle power/energy by not operating the wipers 108 when the user 104 may be looking away from the windshield 106, which may indicate that the user 104 may not require cleaning of the windshield 106 (at that point of time).

On the other hand, responsive to determining that the user 104 may be looking out of the vehicle 102 through the windshield 106, the vehicle 102 may determine whether an object (e.g., a person or another vehicle) may be present in one or more predefined zones (shown as zones 402 in FIG. 4) or "splash zones" in proximity to the vehicle 102. In some aspects, the predefined or splash zones may be those areas/zones in proximity to the vehicle 102 that may receive splashes of water off the windshield 106, when the wipers 108 move and clean the windshield 106. A person ordinarily skilled in the art may appreciate that a person and/or another vehicle that may be present in the predefined zones may face inconvenience when water may be splashed/sprinkled by the moving wipers 108.

Responsive to determining that an object may be present in the predefined zone, the vehicle 102 may not enable (or disable) the wiper movement (even when the user 104 may be looking out of the vehicle 102 through the windshield 106). In this case, the vehicle 102 may wait for a predefined time duration (e.g., 5-25 seconds) and check/determine again whether the object is still present in the predefined zone. Responsive to determining that the object is not present in the predefined zone, the vehicle 102 may cause the wipers 108 to move at the speed that may be associated with the precipitation intensity, as described above. In this manner, the vehicle 102 enables/causes the wiper movement such that the wiper movement does not cause inconvenience to any person or one or more vehicles that may be present in proximity to the vehicle 102 (e.g., in the predefined/splash zone).

In some aspects, the vehicle 102 may further monitor vehicle's surroundings based on the images obtained from the vehicle detection unit when the vehicle 102 may be stationary and may enable the wiper movement (irrespective of whether the user 104 may be looking through the windshield 106 or not) when the vehicle 102 determines that a predefined condition may be met based on the obtained images. For example, the vehicle 102 may cause the wipers 108 to move at the wiper speed that may be associated with the precipitation intensity when the vehicle 102 determines that a condition of a road ("road condition") on which the vehicle 102 may be located may be suboptimal, or when an object/obstacle/person may be located in front of the vehicle 102, and/or the like. The examples of the predefined condition described herein should not be construed as limiting. A person ordinarily skilled in the art may appreciate that in such conditions, it may be beneficial for the user 104 to have a clear view of the area in front of the vehicle 102, so that the user 104 may optimally and cautiously move the vehicle 102 from its stationary state. In this manner, the vehicle 102 may enhance user's convenience of driving the vehicle 102 from the vehicle's stationary state.

Although the description above is described in the context of the user 104 looking through the front windshield 106, the present disclosure is not limited to such an aspect. In some aspects, the vehicle 102 may operate rear wipers in the similar manner as the front wipers 108, based on whether the user 104 may be looking out of the vehicle 102 through the rear windshield. In this case, the vehicle 102 may track the user gaze to determine whether the user 104 may be looking at a center rear-view mirror (to look out of the vehicle 102 through the rear windshield). Responsive to determining that the user 104 may be looking at the center rear-view mirror, the vehicle 102 may cause rear wiper operation in the similar manner as described above.

Further vehicle details are described below in conjunction with FIG. 2.

The vehicle 102 and/or the user 104 implement and/or perform operations, as described here in the present disclosure, in accordance with the owner manual and safety guidelines. In addition, any action taken by the user 104 based on recommendations or notifications provided by the vehicle 102 should comply with all the rules specific to the location and operation of the vehicle 102 (e.g., Federal, state, country, city, etc.). The recommendation or notifications, as provided by the vehicle 102, should be treated as suggestions and only followed according to any rules specific to the location and operation of the vehicle 102.

Figure 2:
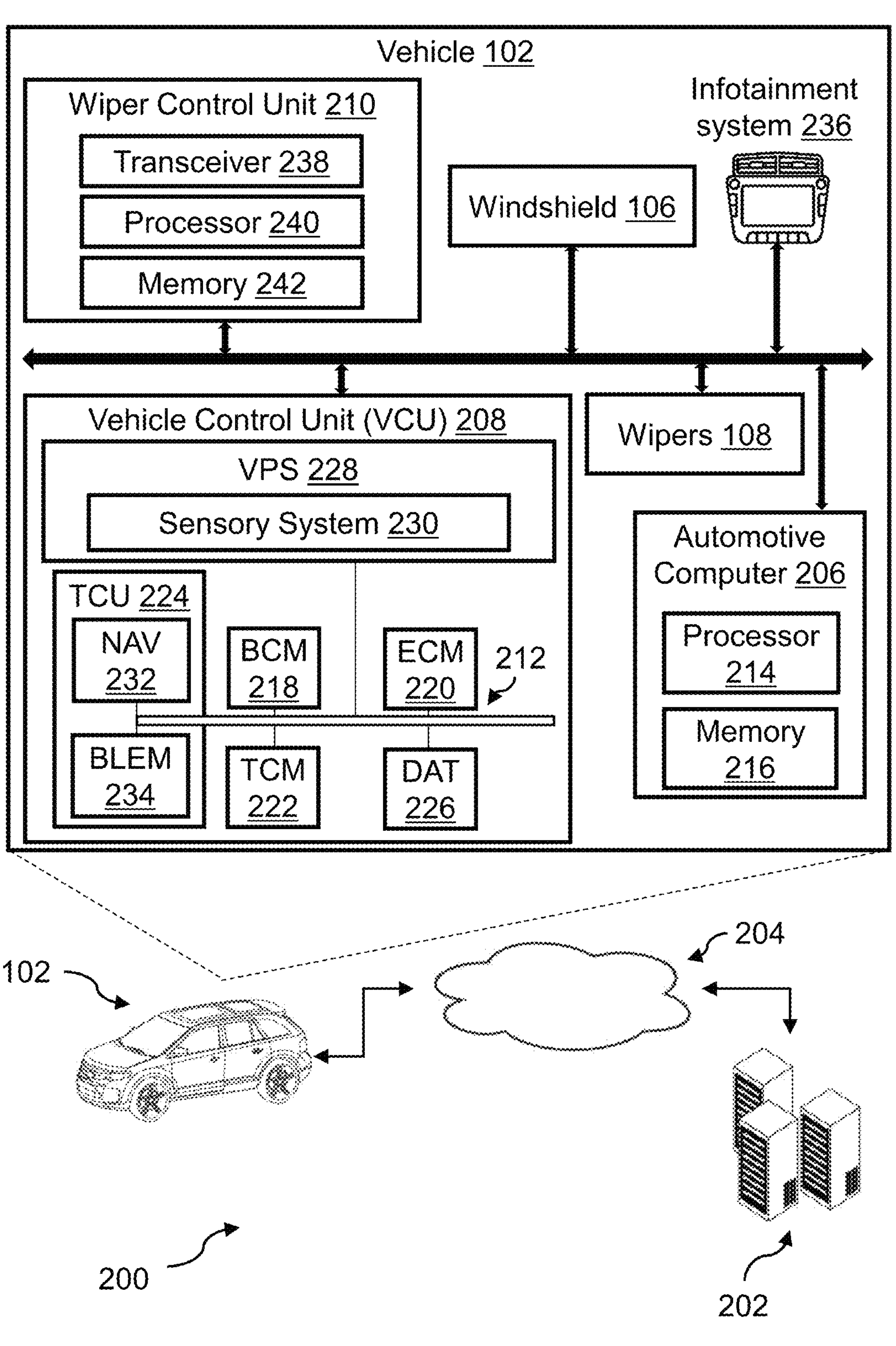
FIG. 2 depicts a block diagram of a system to facilitate auto-wiping operation in a vehicle in accordance with the present disclosure.

FIG. 2 depicts a block diagram of an example system 200 to facilitate auto-wiping operation in the vehicle 102 in accordance with the present disclosure. While describing FIG. 2, references will be made to FIGS. 3A, 3B and 4.

The system 200 may include the vehicle 102 and one or more servers 202 communicatively coupled with each other via one or more networks 204. The server(s) 202 may be part of a cloud-based computing infrastructure and may be associated with and/or include a Telematics Service Delivery Network (SDN) that provides digital data services to the vehicle 102 and other vehicles (not shown in FIG. 2) that may be part of a commercial vehicle fleet. In further aspects, the server(s) 202 may provide AI/ML based image processing algorithms to the vehicle 102, which may enable the vehicle 102 to analyze images captured by one or more vehicle interior and/or exterior cameras and perform one or more actions based on image analysis. For example, the vehicle 102 may determine a blur level associated with the images, determine an object presence in proximity to the vehicle 102, determine a user/driver gaze direction, and/or the like based on the image analysis. In additional aspects, the server(s) 202 may provide a mapping of optimal wiper speeds with different rain intensities to the vehicle 102. The server(s) 202 may provide the mapping and the AI/ML based image processing algorithms to the vehicle 102 at a predefined frequency, or when the vehicle 102 transmits a request to the server(s) 202 to obtain such information.

The network(s) 204 illustrates an example communication infrastructure in which the connected devices discussed in various embodiments of this disclosure may communicate. The network(s) 204 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 206, a Vehicle Control Unit (VCU) 208, and a wiper control unit 210 (or unit 210). The VCU 208 may include a plurality of Electronic Control Units (ECUs) 212 disposed in communication with the automotive computer 206.

In some aspects, the automotive computer 206 and/or the unit 210 may be installed anywhere in the vehicle 102, in accordance with the disclosure. Further, the automotive computer 206 may operate as a functional part of the unit 210. The automotive computer 206 may be or include an electronic vehicle controller, having one or more processor(s) 214 and a memory 216. Moreover, the unit 210 may be separate from the automotive computer 206 (as shown in FIG. 2) or may be integrated as part of the automotive computer 206.

The processor(s) 214 may be in communication with one or more memory devices in communication with the respective computing systems (e.g., the memory 216 and/or one or more external databases not shown in FIG. 2). The processor(s) 214 may utilize the memory 216 to store programs in code and/or to store data for performing aspects in accordance with the disclosure. The memory 216 may be a non-transitory computer-readable memory storing a wiper control program code. The memory 216 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 208 may share a power bus with the automotive computer 206 and may be configured and/or programmed to coordinate the data between vehicle 102 systems, connected servers (e.g., the server(s) 202), and other vehicles (not shown in FIG. 2) operating as part of a vehicle fleet. The VCU 208 may include or communicate with any combination of the ECUs 212, such as a Body Control Module (BCM) 218, an Engine Control Module (ECM) 220, a Transmission Control Module (TCM) 222, a telematics control unit (TCU) 224, a Driver Assistances Technologies (DAT) controller 226, etc. The VCU 208 may further include and/or communicate with a Vehicle Perception System (VPS) 228, having connectivity with and/or control of one or more vehicle sensory system(s) 230 (or a "detection unit"). The vehicle sensory system 230 may include one or more vehicle sensors including, but not limited to, a Radio Detection and Ranging (radar) sensor configured for detection and localization of objects inside and outside the vehicle 102 using radio waves, sitting area buckle sensors, sitting area sensors, a Light Detecting and Ranging (lidar) sensor, door sensors, proximity sensors, temperature sensors, wheel sensors, ambient weather sensors, vehicle internal and external cameras, one or more rain sensors, capacitive moisture sensors, etc. In some aspects, the vehicle sensory system 230 may be configured to (via the vehicle interior and exterior cameras) capture images of a vehicle interior portion and a vehicle surrounding. Further, the rain sensor(s) and/or the capacitive moisture sensors included in the vehicle sensory system 230 may be configured to determine a precipitation intensity or a rate at which raindrops (or snow, splash, soot, dirt, ash, etc.) may be falling on the windshield 106.

In some aspects, the VCU 208 may control vehicle operational aspects and implement one or more instruction sets received from a user device (not shown) associated with the user 104, from one or more instruction sets stored in the memory 216, including instructions operational as part of the unit 210.

The TCU 224 may be configured and/or programmed to provide vehicle connectivity to wireless computing systems onboard and off board the vehicle 102 and may include a Navigation (NAV) receiver 232 for receiving and processing a GPS signal, a BLE Module (BLEM) 234, a Wi-Fi transceiver, a UWB transceiver, and/or other wireless transceivers (not shown in FIG. 2) that may be configurable for wireless communication (including cellular communication) between the vehicle 102 and other systems (e.g., a vehicle key fob, not shown in FIG. 2), computers, and modules. The TCU 224 may be disposed in communication with the ECUs 212 by way of a bus.

The ECUs 212 may control aspects of vehicle operation and communication using inputs from human drivers, inputs from an autonomous vehicle controller, the unit 210, and/or via wireless signal inputs received via the wireless connection(s) from other connected devices, such as the user device associated with the user 104, the server(s) 202, among others.

The BCM 218 generally includes integration of sensors, vehicle performance indicators, and variable reactors associated with vehicle systems and may include processor-based power distribution circuitry that can control functions associated with the vehicle body such as lights, windows, security, camera(s), audio system(s), speakers, wipers, door locks and access control, and various comfort controls. The BCM 218 may also operate as a gateway for bus and network interfaces to interact with remote ECUs (not shown in FIG. 2).

The DAT controller 226 may provide Level-1 through Level-3 automated driving and driver assistance functionality that may include, for example, active parking assistance, vehicle backup assistance, adaptive cruise control, among other features. The DAT controller 226 may also provide aspects of user and environmental inputs usable for user authentication.

In some aspects, the automotive computer 206 may connect with an infotainment system 236. The infotainment system 236 may include a touchscreen interface portion and may include voice recognition features, biometric identification capabilities that can identify users based on facial recognition, voice recognition, fingerprint identification, or other biological identification means. In other aspects, the infotainment system 236 may be further configured to receive user instructions via the touchscreen interface portion, and/or display notifications, navigation maps, etc. on the touchscreen interface portion.

As described above in conjunction with FIG. 1, the vehicle 102 may further include the windshield 106 and the wipers 108. The automotive computer 206 and/or the unit 210 may control wiper operation and movement via the BCM 218.

The computing system architecture of the automotive computer 206, the VCU 208, and/or the unit 210 may omit certain computing modules. It should be readily understood that the computing environment depicted in FIG. 2 is an example of a possible implementation according to the present disclosure, and thus, it should not be considered limiting or exclusive.

In accordance with some aspects, the unit 210 may be integrated with and/or executed as part of the ECUs 212. The unit 210, regardless of whether it is integrated with the automotive computer 206 or the ECUs 212, or whether it operates as an independent computing system in the vehicle 102, may include a transceiver 238, a processor 240, and a computer-readable memory 242.

The transceiver 238 may be configured to receive information/inputs from one or more external devices or systems, e.g., the user device associated with the user 104, the server(s) 202, and/or the like via the network 204. For example, the transceiver 238 may receive the AI/ML based image processing algorithms, the mapping of optimal wiper speeds with different rain intensities, and/or the like from the server(s) 202 via the network 204. Further, the transceiver 238 may transmit notifications (e.g., alert/alarm signals) to the external devices or systems. In addition, the transceiver 238 may be configured to receive information/inputs from vehicle 102 components such as the infotainment system 236, the vehicle sensory system 230, and/or the like. Further, the transceiver 238 may transmit notifications (e.g., alert/alarm/command signals) to the vehicle 102 components such as the infotainment system 236, the BCM 218, etc.

The processor 240 and the memory 242 may be the same as or similar to the processor 214 and the memory 216, respectively. In some aspects, the processor 240 may be an AI/ML based processor that may utilize the memory 242 to store programs in code and/or to store data for performing aspects in accordance with the disclosure. The memory 242 may be a non-transitory computer-readable medium or memory storing the wiper control code. In some aspects, the memory 242 may additionally store the AI/ML based image processing algorithms and the mapping of optimal wiper speeds with different rain intensities that the vehicle 102 may obtain from the server(s) 202.

In operation, the processor 240 may first obtain inputs from the vehicle sensory system 230 (specifically the rain sensor(s)) and determine the precipitation intensity or the rate at which the raindrops (or snow, splash, soot, dirt, ash, etc.) may be falling on the windshield 106 based on the obtained inputs. In some aspects, the processor 240 may obtain the inputs from the rain sensor(s) and/or the capacitive moisture sensor(s) to determine the precipitation intensity when a vehicle ignition may be in an "ON" state.

The processor 240 may further determine whether the vehicle 102 may be moving at a vehicle speed greater than the predefined speed threshold, based on inputs obtained from the VCU 208. Responsive to determining that the vehicle 102 may be moving at a vehicle speed greater than the predefined speed threshold, the processor 240 may fetch the mapping of optimal wiper speeds with different rain intensities from the memory 242 and determine an optimal wiper speed for the wipers 108 based on the determined precipitation intensity and the mapping fetched from the memory 242. The processor 240 may further transmit a command signal to the BCM 218 to cause the wiper movement at the optimal wiper speed associated with the determined precipitation intensity.

On the other hand, responsive to determining that the vehicle speed may be less than the predefined speed threshold, the processor 240 may determine whether the vehicle 102 may be moving slowly or stationary. In some aspects, the processor 240 may determine that the vehicle 102 may be stationary when a vehicle transmission may be in a park state (determined based on the inputs obtained from the VCU 208). In additional aspects, the processor 240 may determine that the vehicle 102 may be stationary or moving slowly based on inputs obtained from the vehicle's wheel sensors. In other aspects, the processor 240 may determine that the vehicle 102 may be stationary by performing image processing of images captured by the vehicle exterior cameras by using the AI/ML based image processing algorithms stored in the memory 242, as described below.

In some aspects, responsive to determining that the vehicle speed may be less than the predefined speed threshold, the processor 240 may obtain one or more vehicle surrounding images captured by the vehicle sensory system 230 (e.g., by the vehicle exterior cameras). In an exemplary aspect, the vehicle surrounding images may include images of traffic lights, surrounding environment, and/or the like. The processor 240 may further perform image processing of the vehicle surrounding images by using the AI/ML based image processing algorithms to determine a blur level associated with the vehicle surrounding images. As described above in conjunction with FIG. 1, the vehicle surrounding images may be blurred (e.g., due to "moving" traffic light colors, surrounding environment, etc.) when the vehicle 102 may be moving slowly and may not be blurred when the vehicle 102 may be stationary.

Responsive to determining the blur level, the processor 240 may compare the blur level with the predefined blur threshold. The processor 240 may determine that the vehicle 102 may be stationary when the blur level may be less than the predefined blur threshold and may determine that the vehicle 102 may be moving slowly when the blur level may be greater than the predefined blur threshold. In some aspects, the processor 240 may cause, via the BCM 218, the wiper movement at the wiper speed associated with the precipitation intensity when the blur level may be greater than the predefined blur threshold (i.e., when the vehicle 102 may be moving slowly).

Figure 3A:
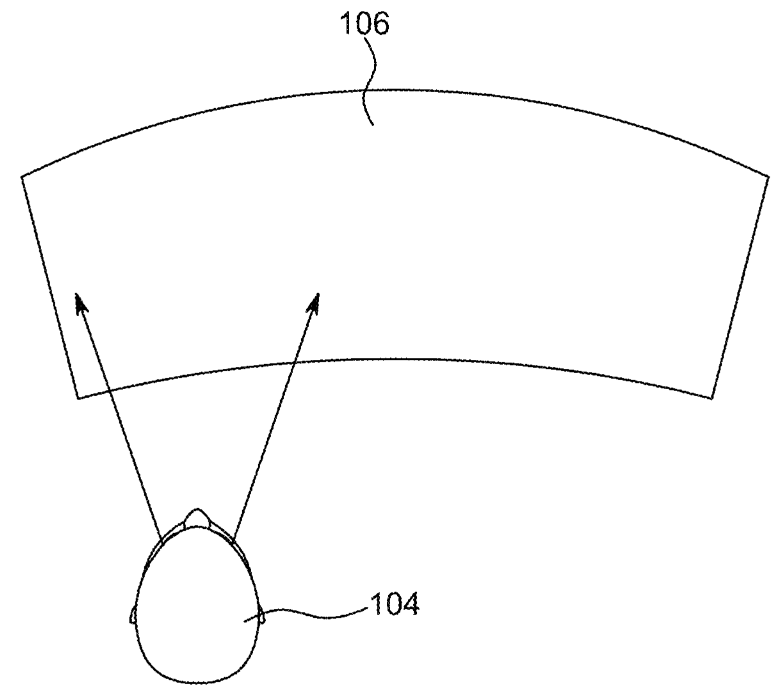
FIG. 3A depicts a snapshot of a first example driver gaze direction in accordance with the present disclosure.
Figure 3B:
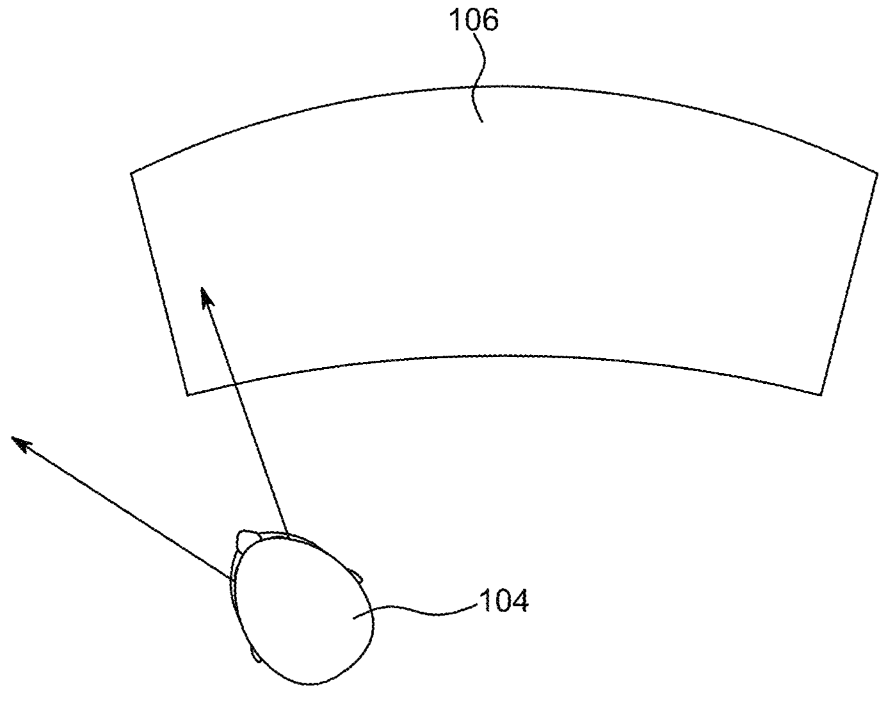
FIG. 3B depicts a snapshot of a second example driver gaze direction in accordance with the present disclosure.

On the other hand, the processor 240 may obtain images of the vehicle interior portion from the vehicle sensory system 230 (e.g., from the vehicle interior cameras) when the blur level may be less than the predefined blur threshold or when the processor 240 determines that the vehicle 102 may be stationary. Responsive to obtaining the vehicle interior portion images, the processor 240 may execute the AI/ML based image processing algorithms on the obtained images and determine a user/driver gaze direction based on the image processing. Specifically, the processor 240 may determine whether the user 104 may be looking out of the vehicle 102 through the windshield 106 (as shown in FIG. 3A, e.g., when the user 104 may be looking at a traffic light, or waiting to pick up user's kid at school or a family member) or the user 104 may be looking away from the windshield 106 (as shown in FIG. 3B), based on the obtained vehicle interior portion images.

Responsive to determining that the user 104 may be looking away from the windshield 106 when the vehicle 102 may be stationary, the processor 240 may not enable (or disable) the wiper movement. Stated another way, the processor 240 may not cause the wiper movement when the user 104 may not be looking towards the windshield 106, thereby conserving vehicle power/energy that may have been spent on (unnecessarily) operating the wipers 108.

Figure 4:
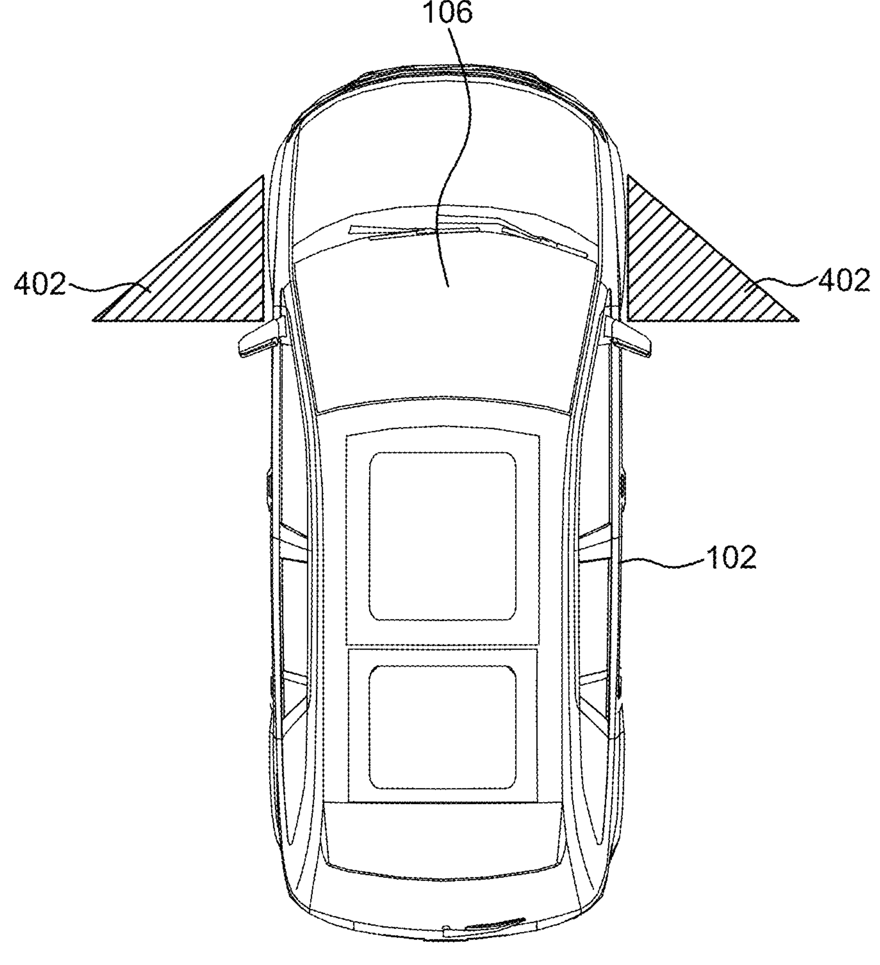
FIG. 4 depicts one or more predefined zones in proximity to a vehicle in accordance with the present disclosure.

On the other hand, responsive to determining that the user 104 may be looking out of the vehicle 102 through the windshield 106 when the vehicle 102 may be stationary, the processor 240 may determine whether an object/person/another vehicle may be present in one or more predefined zones 402 (or "splash zones") in proximity to the vehicle 102 (as shown in FIG. 4), based on inputs/images obtained from the vehicle sensory system 230. As described above in conjunction with FIG. 1, the predefined zones 402 may be those areas/zones in proximity to the vehicle 102 that may receive splashes of water off the windshield 106, when the wipers 108 move and clean the windshield 106. In the exemplary aspect depicted in FIG. 4, the predefined zones 402 may be located in proximity to a front left vehicle portion (e.g., in proximity to or in front of a vehicle driver door) and a front right vehicle portion (e.g., in proximity to or in front of a vehicle front passenger door).

Responsive to determining that an object, a person and/or another vehicle may be present in the predefined zones 402, the processor 240 may not enable (or disable) the wiper movement, even when the user 104 may be looking out of the vehicle 102 through the windshield 106. The processor 240 may not enable (or disable) the wiper movement in such situations to prevent causing any inconvenience to the object/person/other vehicle located in the predefined zones 402 due to the splashing water. As described above in conjunction with FIG. 1, in this case, the processor 240 may wait for the predefined time duration and may check again if the object/person/other vehicle may have left the predefined zones 402.

Responsive to determining that no object, person or vehicle is present in the predefined zones 402, the processor 240 may cause, via the BCM 218, the wiper movement at the wiper speed associated with the precipitation intensity when the user 104 may be looking out of the vehicle 102 through the windshield 106. In this manner, the processor 240 may cause the wiper movement only when the wiper movement may be necessary (i.e., when the user 104 may be looking through the windshield 106) when the vehicle 102 may be stationary, while at the same time ensuring that the wipers 108 do not operate when a person or another vehicle may be located in the predefined zones 402.

In further aspects, the processor 240 may cause the wiper movement at the wiper speed associated with the precipitation intensity when the processor 240 determines that a predefined condition may be met in vehicle's surroundings, even when the user 104 may not be looking through the windshield 106 and the vehicle 102 may be stationary. In this case, the processor 240 may first determine that the predefined condition is met based on a vehicle surrounding image obtained from the vehicle sensory system 230, responsive to determining that the vehicle 102 is in the stationary state. In an exemplary aspect, the predefined condition may be met when a road condition of a road on which the vehicle 102 is located may be suboptimal or an object/obstruction may be present in proximity to a vehicle front portion, and/or the like. Responsive to such determination, the processor 240 may cause, via the BCM 218, the wiper movement at the wiper speed associated with the precipitation intensity even when the user 104 may not be looking through the windshield 106, so that the user 104 may have a clear view of the area in front of the vehicle 102 when the user 104 begins to move the vehicle 102 from its stationary state. In this manner, the processor 240 may enhance user's driving experience when the predefined condition may be met in the vehicle's surroundings.

Figure 5:
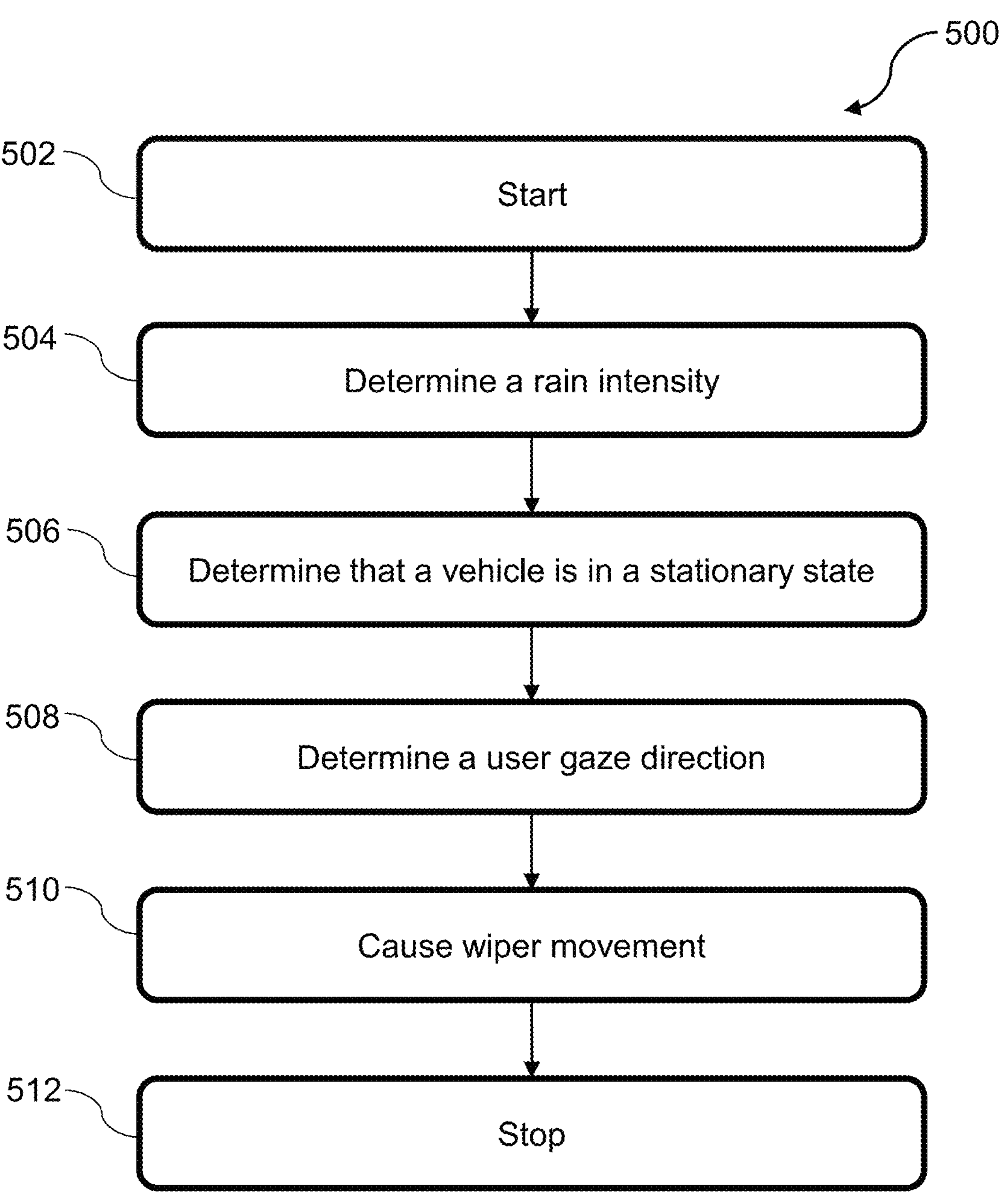
FIG. 5 depicts a flow diagram of a method to facilitate auto-wiping in a vehicle in accordance with the present disclosure.

FIG. 5 depicts a flow diagram of an example method 500 to facilitate auto-wiping in the vehicle 102 in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include determining, by the processor 240, the precipitation intensity based on the inputs obtained from the rain sensor(s). At step 506, the method 500 may include determining, by the processor 240, that the vehicle 102 is in the stationary state, as described above in conjunction with FIGS. 1 and 2.

At step 508, the method 500 may include determining, by the processor 240, a user gaze direction or that the user 104 may be looking out of the vehicle 102 through the windshield 106 based on the inputs/images obtained from the vehicle sensory system 230, responsive to determining that the vehicle 102 is in the stationary state. At step 510, the method 500 may include causing, by the processor 240, the wiper movement at the wiper speed associated with the precipitation intensity when the user 104 may be looking out of the vehicle 102 through the windshield 106, as described above in conjunction with FIGS. 1 and 2.

The method 500 may end at step 512.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
- a glazing;
- a wiper configured to clean the glazing;
- a detection unit configured to capture images of a vehicle interior portion and a vehicle surrounding; and
- a processor communicatively coupled with the detection unit and the wiper, wherein the processor is configured to:
  - determine a precipitation intensity;
  - determine that the vehicle is in a stationary state;
  - determine, responsive to determining that the vehicle is in the stationary state, that a user located in the vehicle interior portion is looking out of the vehicle through the glazing based on inputs obtained from the detection unit;
  - determine, responsive to determining that the user is looking out of the vehicle through the glazing, presence of a person in a splash zone of the vehicle based on the inputs from the detection unit, wherein the splash zone is an area in proximity to the vehicle in which the wiper directs water from the glazing during operation of the wiper;
  - disable, responsive to determining the presence of the person in the splash zone, movement of the wiper for a predefined time duration;
  - determine, after the predefined time duration, that the person is not present in the splash zone; and
  - cause, responsive to determining that the person is not present in the splash zone, a wiper movement at a speed associated with the precipitation intensity.

2. The vehicle of claim 1, wherein the processor is further configured to:
- determine that a vehicle speed is less than a predefined speed threshold;
- obtain a vehicle surrounding image from the detection unit responsive to determining that the vehicle speed is less than the predefined speed threshold;
- perform image processing to determine a blur level associated with the vehicle surrounding image; and
- determine that the vehicle is in the stationary state when the blur level is less than a predefined blur threshold.

3. The vehicle of claim 2, wherein the processor is further configured to cause the wiper movement at the speed associated with the precipitation intensity when the vehicle speed is greater than the predefined speed threshold.

4. The vehicle of claim 2, wherein the processor is further configured to cause the wiper movement at the speed associated with the precipitation intensity when the blur level is greater than the predefined blur threshold.

5. The vehicle of claim 1, wherein the processor is configured to determine that the vehicle is in the stationary state when a vehicle transmission is in a park state.

6. The vehicle of claim 1, wherein the processor is further configured to disable the wiper movement when the user is looking away from the glazing and the vehicle is in the stationary state.

7. The vehicle of claim 1, wherein the detection unit comprises a vehicle exterior camera configured to capture images of the splash zone.

8. The vehicle of claim 1, wherein the processor is configured to determine that the vehicle is in the stationary state based on inputs obtained from wheel sensors of the vehicle.

9. The vehicle of claim 1, wherein the processor is further configured to:
- determine, responsive to determining that the vehicle is in the stationary state, that a predefined condition is met based on a vehicle surrounding image obtained from the detection unit; and
- cause the wiper movement at the speed associated with the precipitation intensity when the predefined condition is met.

10. The vehicle of claim 9, wherein the predefined condition is met when a road condition is suboptimal or an object is present in proximity to a vehicle front portion.

11. The vehicle of claim 1, wherein the detection unit comprises one or more of a vehicle interior camera, a vehicle exterior camera, a radio detection and ranging (radar) sensor and a light detection and ranging (lidar) sensor.

12. The vehicle of claim 1, further comprising at least one of a rain sensor or a capacitive moisture sensor, wherein the processor determines the precipitation intensity based on inputs obtained from the rain sensor or the capacitive moisture sensor.

13. A method to facilitate auto-wiping in a vehicle, the method comprising:
- determining, by a processor, a precipitation intensity;
- determining, by the processor, that the vehicle is in a stationary state;
- determining, by the processor and responsive to determining that the vehicle is in the stationary state, that a user located in a vehicle interior portion is looking out of the vehicle through a glazing based on inputs obtained from a detection unit;
- determining, by the processor and responsive to determining that the user is looking out of the vehicle through the glazing, presence of a person in a splash zone of the vehicle based on the inputs from the detection unit, wherein the splash zone is an area in proximity to the vehicle in which a wiper directs water from the glazing during operation of the wiper;
- disabling, by the processor and responsive to determining the presence of the person in the splash zone, movement of the wiper for a predefined time duration;
- determining, by the processor and after the predefined time duration, that the person is not present in the splash zone; and causing, by the processor and responsive to determining that the person is not present in the splash zone, a wiper movement at a speed associated with the precipitation intensity.

14. The method of claim 13, further comprising:

determining that a vehicle speed is less than a predefined speed threshold;

obtaining, responsive to determining that the vehicle speed is less than the predefined speed threshold, a vehicle surrounding image from the detection unit;

performing image processing to determine a blur level associated with the vehicle surrounding image; and determining that the vehicle is in the stationary state when the blur level is less than a predefined blur threshold.

15. The method of claim 14, further comprising causing the wiper movement at the speed associated with the precipitation intensity when the vehicle speed is greater than the predefined speed threshold.

16. The method of claim 14, further comprising causing the wiper movement at the speed associated with the precipitation intensity when the blur level is greater than the predefined blur threshold.

17. The method of claim 13, further comprising disabling the wiper movement when the user is looking away from the glazing and the vehicle is in the stationary state.

18. The method of claim 13, wherein the processor determines that the vehicle is in the stationary state based on inputs obtained from wheel sensors of the vehicle.

19. The method of claim 13, wherein the detection unit comprises one or more of a vehicle interior camera, a vehicle exterior camera, a radio detection and ranging (radar) sensor and a light detection and ranging (lidar) sensor.

20. A non-transitory computer-readable storage medium having instructions stored thereupon which, when executed by a processor, cause the processor to:

determine a precipitation intensity;

determine that a vehicle is in a stationary state;

determine, responsive to determining that the vehicle is in the stationary state, that a user located in a vehicle interior portion is looking out of the vehicle through a glazing based on inputs obtained from a detection unit;

determine, responsive to determining that the user is looking out of the vehicle through the glazing, presence of a person in a splash zone of the vehicle based on the inputs from the detection unit, wherein the splash zone is an area in proximity to the vehicle in which a wiper directs water from the glazing during operation of the wiper;

disable, responsive to determining the presence of the person in the splash zone, movement of the wiper for a predefined time duration;

determine, after the predefined time duration, that the person is not present in the splash zone; and cause, responsive to determining that the person is not present in the splash zone, a wiper movement at a speed associated with the precipitation intensity.

* * * * *